June 24, 1930.  N. TRBOJEVICH  1,766,153
SLIDING GEAR AND METHOD OF SYNCHRONIZING THE SAME
Filed Nov. 19, 1928   2 Sheets-Sheet 1
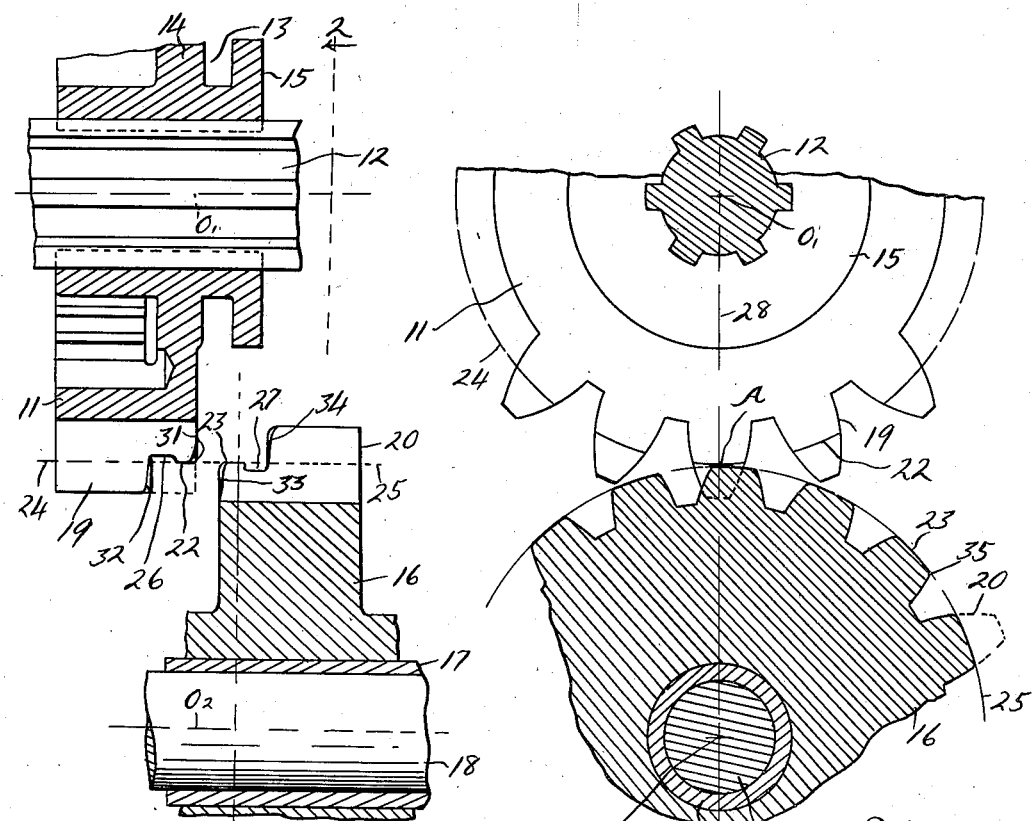
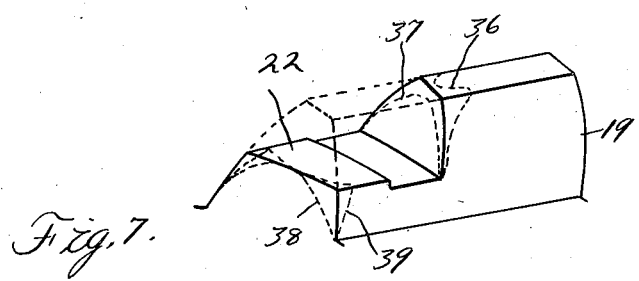
INVENTOR
Nikola Trbojevich
BY
ATTORNEYS June 24, 1930. N. TRBOJEVICH 1,766,153
SLIDING GEAR AND METHOD OF SYNCHRONIZING THE SAME
Filed Nov. 19, 1928 2 Sheets-Sheet 2
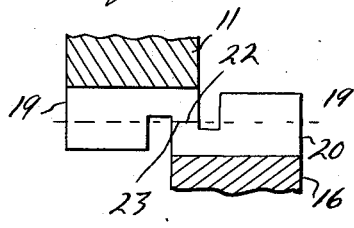
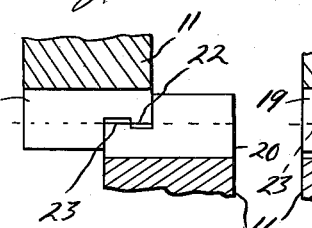
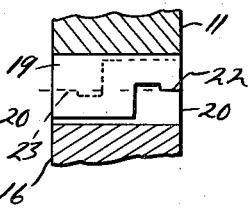
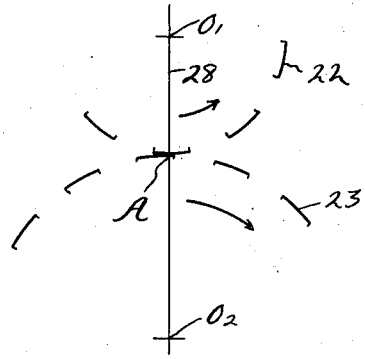
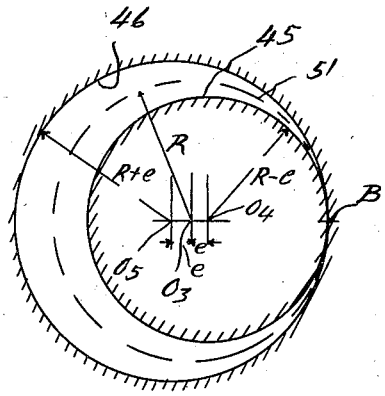
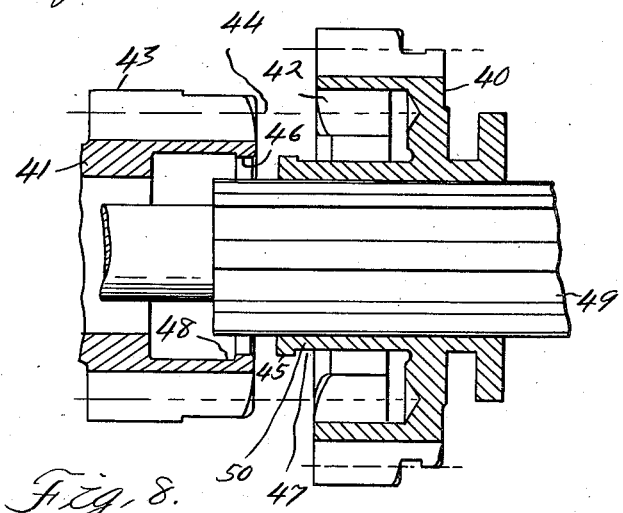
INVENTOR
Nikola Trbojevich
BY
ATTORNEYS Patented June 24, 1930

1,766,153

UNITED STATES PATENT OFFICE

NIKOLA TRBOJEVICH, OF HIGHLAND PARK, MICHIGAN

SLIDING-GEAR AND METHOD OF SYNCHRONIZING THE SAME

Application filed November 19, 1928. Serial No. 320,493.

The invention relates to gearing and more particularly to sliding gears such as are used in automobile transmissions for changing the speed ratios.

The principal object of the invention is to provide an improved form of gearing adapted to be shifted into intermeshing engagement with a minimum amount of clashing or noise. Another object is to provide a device for synchronizing the speeds of rotation of two gears. Further objects are to construct a synchronizing device that is simple, sturdy, compact and can be manufactured at low cost.

These and other objects are attained by providing the novel construction hereinafter more fully described and illustrated in the accompanying drawings, wherein Figure 1 is a section through two sliding gears constructed in accordance with the invention;

Figure 2 is a cross section on the line 2—2 of Figure 1;

Figures 3, 4 and 5 are diagrams showing successive stages of engagement of the gears illustrated in Figures 1 and 2;

Figure 6 is a diagram explanatory of the principle involved in the invention when applied to two external gears;

Figure 7 is a perspective view of one of the teeth of the gears;

Figure 8 is a longitudinal section through a pair of co-axial sliding clutch elements constructed in accordance with the invention;

Figure 9 is a diagram explanatory of the construction shown in Figure 8.

As shown in Figures 1 and 2 the spur gear 11 is slidably mounted upon the splined shaft 12 and may be shifted upon the latter in the usual manner by means of a fork (not shown) fitting into the slot 13 formed by the side wall 14 of the gear and the collar 15 integral therewith.

The mating gear 16 is keyed to the bushing 17, said bushing being rotatable upon the stationary or jack shaft 18.

The principle upon which this construction is based consists in first bringing the two gears in mesh by friction alone until their pitch line velocities are equalized and then shifting the said two gears one into the other.

The teeth 19 of the gear 11 and the corresponding teeth 20 of the gear 16 are formed with this object in view. The adjacent ends of the gears 11 and 16 have portions of the teeth cut down to substantially the pitch diameters 24 and 25 of the respective gears forming the cylindrical friction surfaces 22 and 23. These surfaces may be made slightly oversize to allow for the springing of the shafts 12 and 18 and to insure that a certain pressure will exist between the surfaces when they are in contact. The arrangement is such that when the surface 22 is moved axially into contact with the surface 23 there will be sufficient friction to accelerate or retard the rotation of one gear from the other until the speed of rotation of the two is identical.

Between the friction surfaces 22 and 23 and the main portions of the respective teeth 19 and 20, may be arranged clearance spaces 26 and 27, the diameters of which are slightly less than the corresponding friction surfaces 22 and 23. The axial dimensions of each clearance space is equal to the axial width of the friction surface on the cooperating gear, the purpose being to relieve the friction pressure between the two gears just prior to the complete intermeshing of the teeth 19 and 20. While these clearance spaces are desirable in certain embodiments of my invention, there are other cases where the clearance spaces may be eliminated and the invention in its broader aspects is not predicated upon this particular feature.

Looking now at the Figures 2 and 6 it is seen that during the period of synchronization the corresponding friction surfaces 22 and 23 can contact only at the pitch point A lying in the line 28 connecting the gear centers O and $O_2$. It is further seen that the said contact at the point A, assuming that the surfaces 22 are the driver and surfaces 23 the driven member, will accelerate the latter gear whenever its pitch line velocity is less than that of the driver, and will retard it if it is greater. At any rate, there will be a tendency to equalize the two velocities, the time taken for such an equalization depending upon the frictional force (or the pressure) exerted at the point "A" in a direct ratio and also upon the inertia of the member 23, in a reverse ratio. It is conceivable that in certain cases the surface 22 will not touch the surfaces 23 at all. It is, however, significant to note that such an event can occur only in the case when the two gears are already in synchronism.

Generally, the surfaces 22 and 23 will touch each other intermittently. As the length of the segments 22 and 23 each is equal to one-half of the circular pitch of the gears, the probability that at any given instant a segment 22 will be at "A" is one-half, and the probability for the segment 23 is also one-half, giving the aggregate probability of one-fourth. This fact makes it certain that the synchronizing device will become operative practically as soon as the gear 11 is shifted.

Figures 3, 4 and 5 diagrammatically represent the three phases of the shifting process. In Figure 3 the friction surfaces 22 and 23 are in contact and the gears 11 and 16 are being synchronized. In Figure 4 the surfaces 22 and 23 are being disengaged for a brief moment and in Figure 5 the two gears are in operative position, i. e. intermeshing.

In order to provide a smooth inter-engagement of the teeth 19 and 20, it is preferable to chamfer the same as indicated at 31, 32, 33 and 34 in Figure 1 and at 35 in Figure 2 and at 36, 37, 38 and 39 in Figure 7. The dotted lines in said figures indicate the portions of the teeth that are cut-away by the chamfering operation.

In applying my invention to co-axial clutch elements certain modified constructions can be employed. Thus, as illustrated in Figure 8 the gear 40 is axially slidable on a splined shaft 49 in axial alignment with the gear 41. The gear 40 has a plurality of equi-spaced internal teeth 42 constructed to intermesh with a corresponding number of external teeth 43 on the gear 41, the two having a common pitch diameter as indicated at 44. In view of the co-axial arrangement of the gears, it is not necessary that the friction surfaces have the same diameter as the pitch diameter. Therefore as shown in Figure 8, the gear 40 is provided with a projecting sleeve 50 extending forwardly of the teeth 42 and having an annular surface 45 formed thereon. The gear 41 may have an internal annular surface 46 of substantially the same diameter as the surface 45, in which case the two friction surfaces would engage for their entire peripheries. The gears 40 and 41 are each provided with clearance spaces 47 and 48, respectively, for the same reasons as outlined above in connection with the externally meshing gears.

It is, however, undesirable to have friction contact between surfaces 45 and 46 for the entire peripheral extent of the same for the reason that such a construction would be liable to cause the shafts to "seize" and thus damage the transmission. Therefore, it is preferable to make the surfaces 45 and 46 slightly eccentric so that the contact between the two occurs at only one circumferential point. This is indicated diagrammatically in Figure 9 where $O_3$ represents the axis of rotation of the two gears and the circle 51 represents the ideal or pitch circle of the co-operating gears. The external friction surface 45 has its center at the point $O_4$ spaced a distance $e$ from the center $O_3$. The radius of the surface 45 is equal to $R-e$, where R represents the radius of the pitch circle 51 from the center $O_3$. The internal friction surface 46 has its center at the point $O_5$ on the opposite side of the center $O_3$ and spaced therefrom by the same distance $e$. The radius of the internal surface 46 is equal to $R+e$. With the construction as described, it will be observed that the internal surface 46 contacts with the external surface 45 at a single point B and the point of contact progresses around the axis of rotation when the two gears travel at different speeds. The distance $e$ may be very small, being just sufficient to insure adequate clearance between the two surfaces 45 and 46 to prevent seizing under practical conditions. It is also preferable that the member 45 be made slightly oversize to exert an appreciable and predetermined pressure at the point B by means of its elastic resiliency.

What I claim as my invention is:

1. In a transmission, a pair of gears having teeth thereon constructed to intermesh, one of said gears being axially movable relative to the other and surfaces formed at the entering ends of said teeth being of a diameter proportional to their respective numbers of teeth to frictionally engage and synchronize each other prior to the intermeshing thereof.

2. A sliding gear having peripheral teeth formed thereon, the ends of which extend outwardly beyond the pitch line, said teeth having the end portions cut down so that the peripheral surfaces thereof are of substantially the pitch diameter, said teeth having a clearance space of smaller diameter intermediate the portions of the teeth aforeaid.

3. In a transmission, a pair of gears having teeth adapted to intermesh, one of said gears being mounted for axial movement relative to the other, each of said gears having the main portions of the teeth extending outwardly beyond the pitch line thereof and having the adjacent end portions of the teeth substantially equal to the pitch diameter whereby peripheral frictional contact is obtained therebetween.

4. In a transmission, a pair of gears having teeth adapted to intermesh, one of said gears being mounted for axial movement relative to the other, each of said gears having the main portions of the teeth extending outwardly beyond the pitch line thereof and having the adjacent end portions of the teeth substantially equal to the pitch diameter whereby peripheral frictional contact is obtained therebetween and each gear having a clearance space of lesser diameter intermediate the portions of the gear teeth aforesaid, said clearance space being of an axial dimension equal to or greater than the axial dimension of the cooperating friction surfaces.

5. In a transmission, a pair of gears having teeth adapted to intermesh, one of said gears being mounted for axial movement relative to the other, each of said gears having the main portions of teeth extending outwardly beyond the pitch line thereof and having the adjacent end portions of the teeth substantially equal to the pitch diameter at their periphery and rounded off about their entering faces whereby a frictional contact, a synchronization and an easy shifting are obtained in the order named.

6. In a transmission, a pair of gears having teeth adapted to intermesh, one of said gears being mounted for axial movement relative to the other, each of said gears having the main portions of the teeth extending outwardly beyond the pitch line thereof and having the adjacent end portions of the teeth substantially equal to the pitch diameter whereby peripheral frictional contact is obtained therebeween, each gear having a clearance space of lesser diameter intermediate the portions of the gear teeth aforesaid and entering faces in the said portions rounded off to facilitate shifting whereby a metallic contact, synchronization, a momentary cessation of the metallic contact and an easy shift are obtained in the order named.

In testimony whereof I affix my signature.

NIKOLA TRBOJEVICH.